United States Patent [19]
Sugiyama

[11] 3,765,812
[45] Oct. 16, 1973

[54] MOLD CLAMPING MECHANISM FOR MOLDING MACHINE
[75] Inventor: Shichiro Sugiyama, Shimizu, Japan
[73] Assignee: Kawaguchi, Ltd., Shizuoka-ken, Japan
[22] Filed: May 13, 1971
[21] Appl. No.: 142,886

[30] Foreign Application Priority Data
May 13, 1970 Japan.............................. 45/40146

[52] U.S. Cl................. 425/150, 425/242, 425/450
[51] Int. Cl................................................. B29f 1/06
[58] Field of Search........................... 425/242, 450; 18/30 L; 29/238

[56] References Cited
UNITED STATES PATENTS
2,618,823  11/1952  Perkon............................ 29/238 X
3,327,353  6/1967  Eggenberger...................... 425/450
3,156,014  11/1964  Wenger...................... 18/30 LV UX
3,263,277  8/1966  Ohlendorf et al................... 425/450

Primary Examiner—J. Howard Flint, Jr.
Attorney—James E. Armstrong and Ronald S. Cornell

[57] ABSTRACT

The present invention relates to a clamp mechanism of a molding machine comprising a wedge capable of making reciprocal movement perpendicularly towards and away from the axial core of a moving cylinder. One end of the cylinder is provided with at least one oblique surface having the same angle as the wedge. The wedge is moved towards the moving cylinder as the cylinder approaches the end of the mold clamping stroke, and the oblique surface of the wedge engages the oblique surface of the moving cylinder to the effect that the expanding force caused by the wedge effect generated by said engagement is utilized as the clamping force.

3 Claims, 5 Drawing Figures

MOLD CLAMPING MECHANISM FOR MOLDING MACHINE

BACKGROUND OF THE INVENTION

In a conventional clamp design for a molding machine, either a straight hydraulic ram method or an hydraulically operated toggle system is normally adopted. The straight hydraulic system has the advantages of easy adjustability of the mold-clamping source and accurate adjustment of pressure. At the same time the molds opening stroke can be increased. Unfortunately, however, in such system it is necessary to use a fast feeding mechanism, and also to provide a high pressure pump capable of exhausting relatively large amounts of hydraulic fluid. The necessary apparatus becomes large and at the same time, the required pressure cannot be obtained because of the suction of air or liquid volume compression.

On the other hand, in the so called toggle system, i.e., the hydraulically operated toggle system, according to which the hydraulic pressure is increased by means of a link mechanism which extends the tie-bar and in which the clamping force is generated by utilizing the elastic restorability thereof, high pressure can be obtained by relatively simple structure but there are drawbacks to such systems. For example, accurate adjustment of the mold clamping force cannot be made and the mold opening stroke is small. In addition, large strain, bending, and compression stress work on the structural components, and great damage is done to the sliding frictional portions.

It is therefore an object of the present invention to eliminate the above mentioned drawbacks of the prior art thereby obtaining a clamping mechanism having a high mold clamping force while increasing the mold clamping stroke so that a mold clamping mechanism capable of generating the required mold clamping force can be obtained.

SUMMARY

The present invention provides a mechanism for clamping molds in a molding machine comprising a wedge which is capable of reciprocating perpendicularly towards and away from the axial core of a moving cylinder. One end of the cylinder is provided with at least one oblique surface having the same angle in the wedge. When said wedge is moved towards and engages the oblique end of the moving cylinder the expanding force caused by the wedge effect generated by said engagement is utilized as the clamping force for the mold.

Also, the present invention is the mold clamping mechanism in a molding machine in which a wedge is operated by the hydraulic cylinder, and the wedge is rotatably connected to the piston rod of the hydraulic cylinder in the form of hinge.

Further the present invention is the mold clamping mechanism in a molding machine comprising providing a plural number of wedges, connecting said wedges to a movable metal member through links, and detecting the difference of the operation speeds of said plural number of wedges through said movable metal member, to the effect that the hydraulic cylinder for operating the wedges can be controlled thereby.

BRIEF DESCRIPTION OF THE DRAWINGS

In the attached drawings which show one embodiment of the present invention.

DETAILED DESCRIPTION

Figure 1:
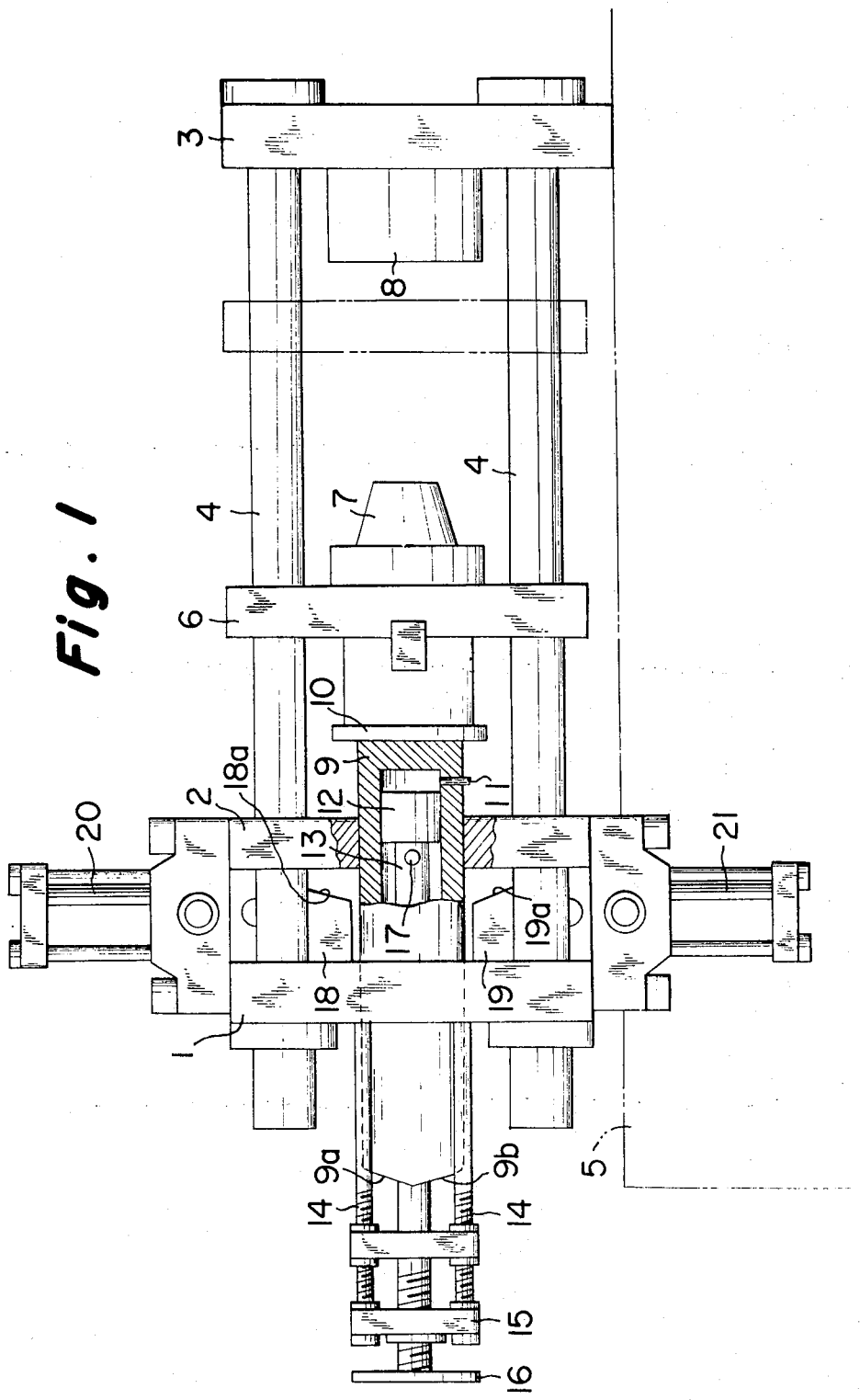
FIG. 1 is a partially cut away side view of the mold in the completely open position.

Referring now to the attached drawings, stationary plate 1, guide plate 2 and pressure resistant stationary platen 3 are fixedly arranged in parallel relation to each other at predetermined intervals on a plurality of tie-bars 4, and they are also fixed on base 5. Movable platen 6 is slidably mounted on and capable of movement along free tie-bars 4 between guide plate 2 and stationary platen 3. A mold cavity is formed between mold halves 7 and 8 which are faced opposite to each other and are fixed respectively on movable platen 6 and pressure resistant stationary platen 3. Moving cylinder 9 passes through fixed plate 1 and guide plate 2 on their respective center lines, and is guided by said plates 1 and 2. One end of cylinder 9 is fixed on guide plate 10 which is fixed to said moving platen 6. The other end of cylinder 9 is provided with oblique surfaces 9a and 9b which diagonally extend on opposite sides of the center line of the cylinder which forms a symmetrical axis for the oblique surfaces 9a and b which together form the head portion of said moving cylinder 9. Cylinder 9 is hollow and is provided with a piston 12 inserted therein. An inlet-outlet opening 11 for pressurized fluid is formed in the wall of cylinder 9, and a piston rod 13 is fixed on said piston 12 and projects from the side of the head of the cylinder 9. The other end of the piston rod 13 is adjustably mounted on a guide plate 15 which in turn is fixedly mounted by means of a plurality of stay bolts 14 on plate 1 coaxially with the moving cylinder 9. In the embodiment shown piston rod 13 and the guide plate 15 are connected by screw threads and adjustment of the position of the piston rod 13 relative to fixed plate 1 can be carried out by rotating the piston rod 13 with adjusting nut 16 attached to the end of the piston rod 13. Fine adjustment of stroke of the moving cylinder 9 can therefore be carried out. Piston rod 13 is in the form of pipe so that it can be used as a path for pressurized fluid, and the inlet-outlet opening 17 is provided in a position close to piston head 12.

Figure 3:
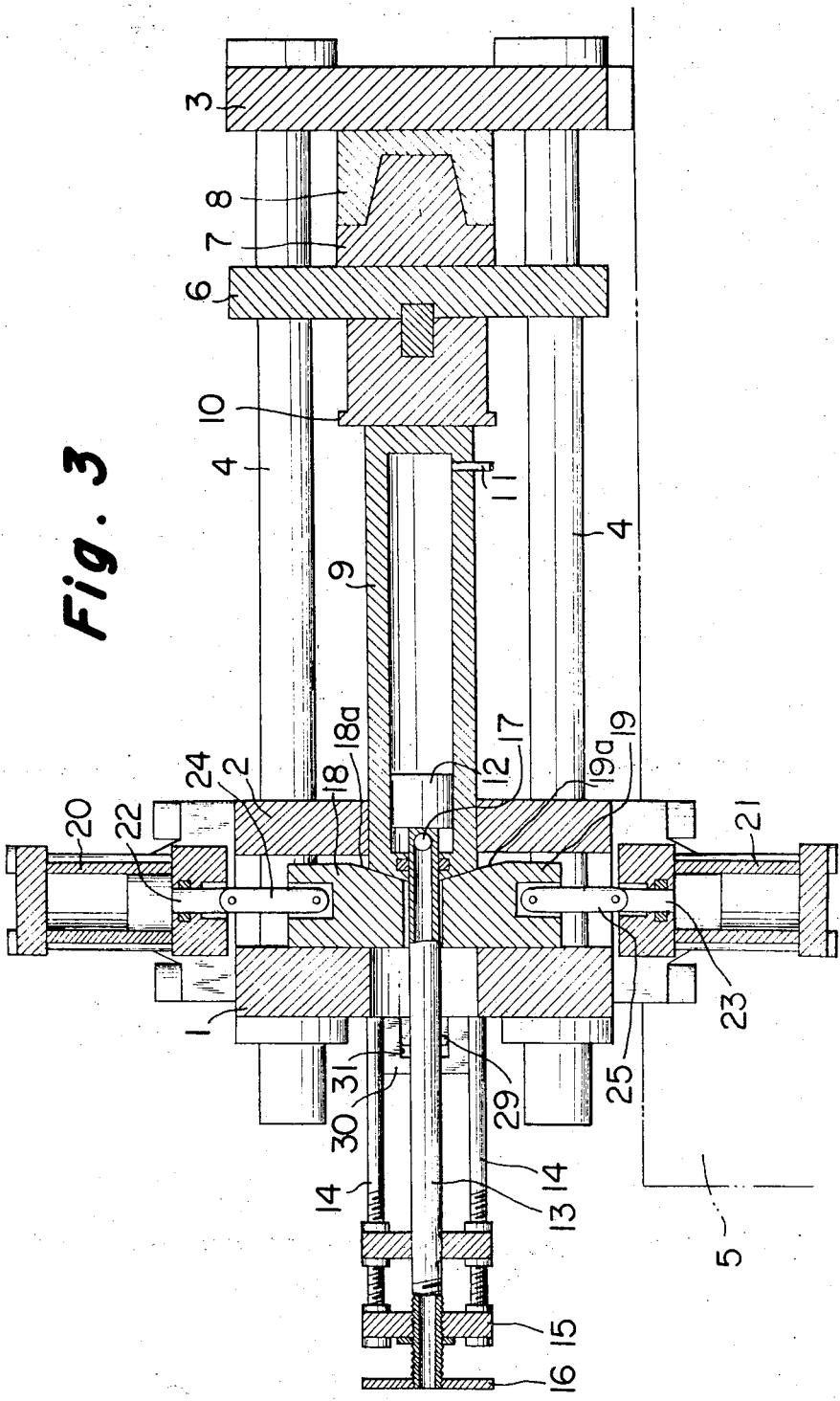
FIG. 3 is a vertical cross sectional view showing the mold clamping operation at its completion.

Wedges 18 and 19 are symmetrically provided with the center line of the moving cylinder 9 as the fulcrum, and are provided with oblique surfaces 18a and 19a having the same angle as those of the oblique surfaces 9a and 9b. As is shown in FIG. 3, wedges 18 and 19 can be moved perpendicularly to the center line of cylinder 9 towards that center line and along the fixed plate 1. When wedges 18 and 19 get close to the axial cores, the respective oblique surfaces 18a and 19a are capable of engagement with the oblique surfaces 9a and 9b of moving cylinder 9 as shown in FIG. 3, and in this case said moving cylinder 9 is pushed in the axial direction by means of the wedge effect. Hydraulic pressure cylinders 20, 21 operate wedges 18 and 19 and the ends of piston rods 22 and 23 of said hydraulic cylinders 20 and 21 together with the above described wedges 18 and 19 are engaged by having links 24 and 25 therebetween and the respective joint portions can be freely rotated.

Figure 4:
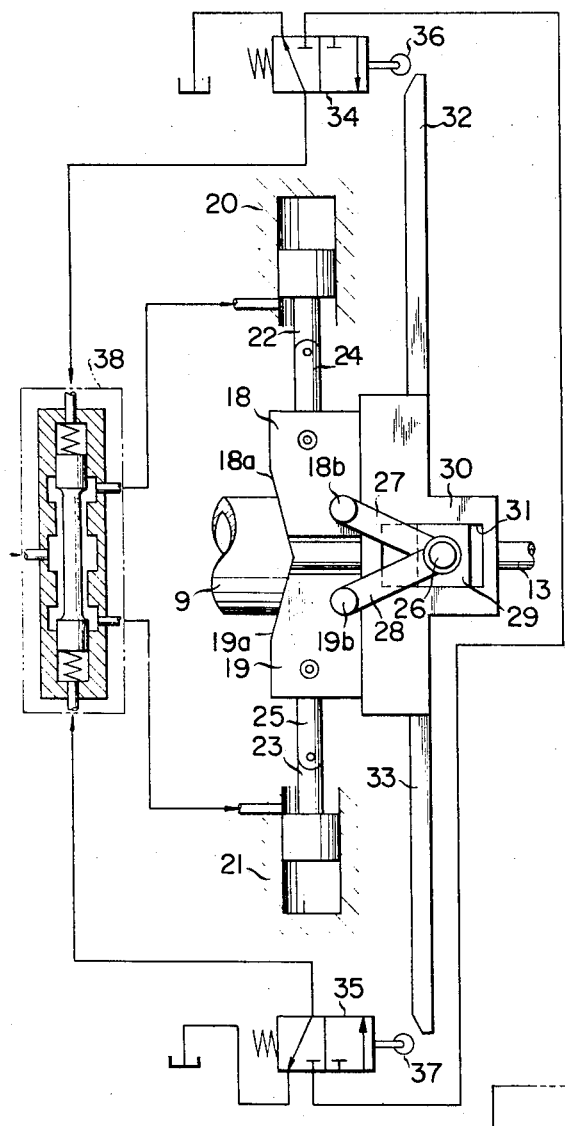
FIG. 4 is a partial side view of the opposite side of the apparatus showing the operating device of the mold clamping wedge.
Figure 5:
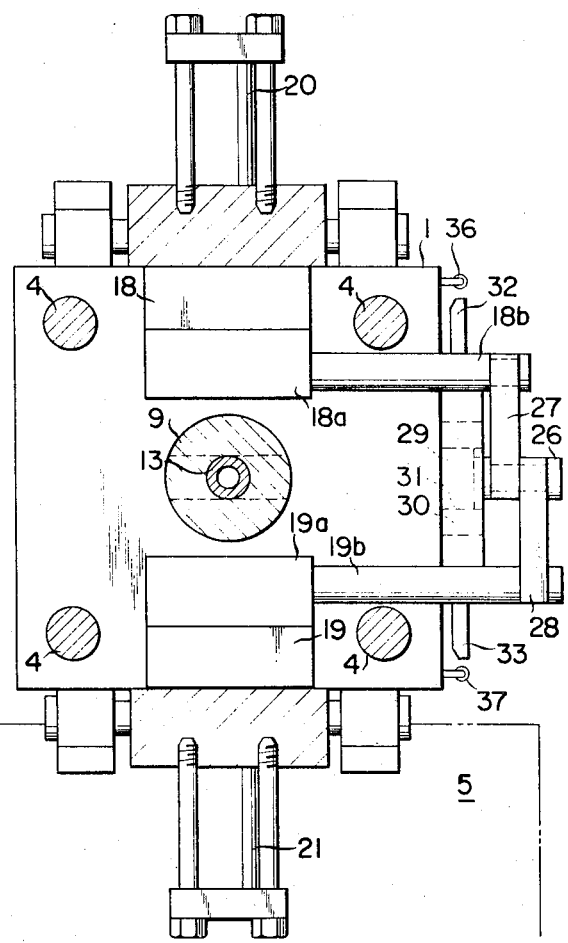
FIG. 5 is a cross-sectional view of V—V line of FIG. 2.

On one side surface of each of said wedges 18 and 19, fulcrums 18b and 19b are respectively arranged at equal distances from the respective end portions as is shown in FIG. 4. Links 27 and 28 of equal length are connected at one end of each to fulcrums 18b and 19b. The other end of each of links 27, 28 are rotatably connected with pin 26. The pin 26 connecting said links 27 and 28 is fixed onto a movable roller 29 which is engaged in groove 31 provided in the center of a movable metal 30. When the two wedges 18, 19 move simultaneously at the same speed, the two links 27, 28 swing symmetrically and the metal 30 is maintained unmoved. However, member 30 is capable of moving in the same direction as said wedges 18 and 19. Said groove 31 is provided in the axial direction of moving cylinder 9, and said movable roller 29 can be moved in the axial direction of the moving cylinder 9 along the grooves 31. Push-rods 32 and 33 are fixed on both end portions of movable metal member 30. The end portions of push-rods 32 and 33 are tapered and when said movable metal member 30 is moved, the end portions of push rods 32 and 33 push the rollers 36 and 37 of selector valves 34 and 35 (FIG. 4). Selector valve 38 is mounted between hydraulic cylinders 20 and 21 for operating said wedges 18 and 19 and the hydraulic pressure source (not shown) and said selector valve 38 is positioned by said push rods 32 and 33. The hydraulic pressure circuit shown in FIG. 4 is for extracting wedges 18 and 19.

Figure 2:
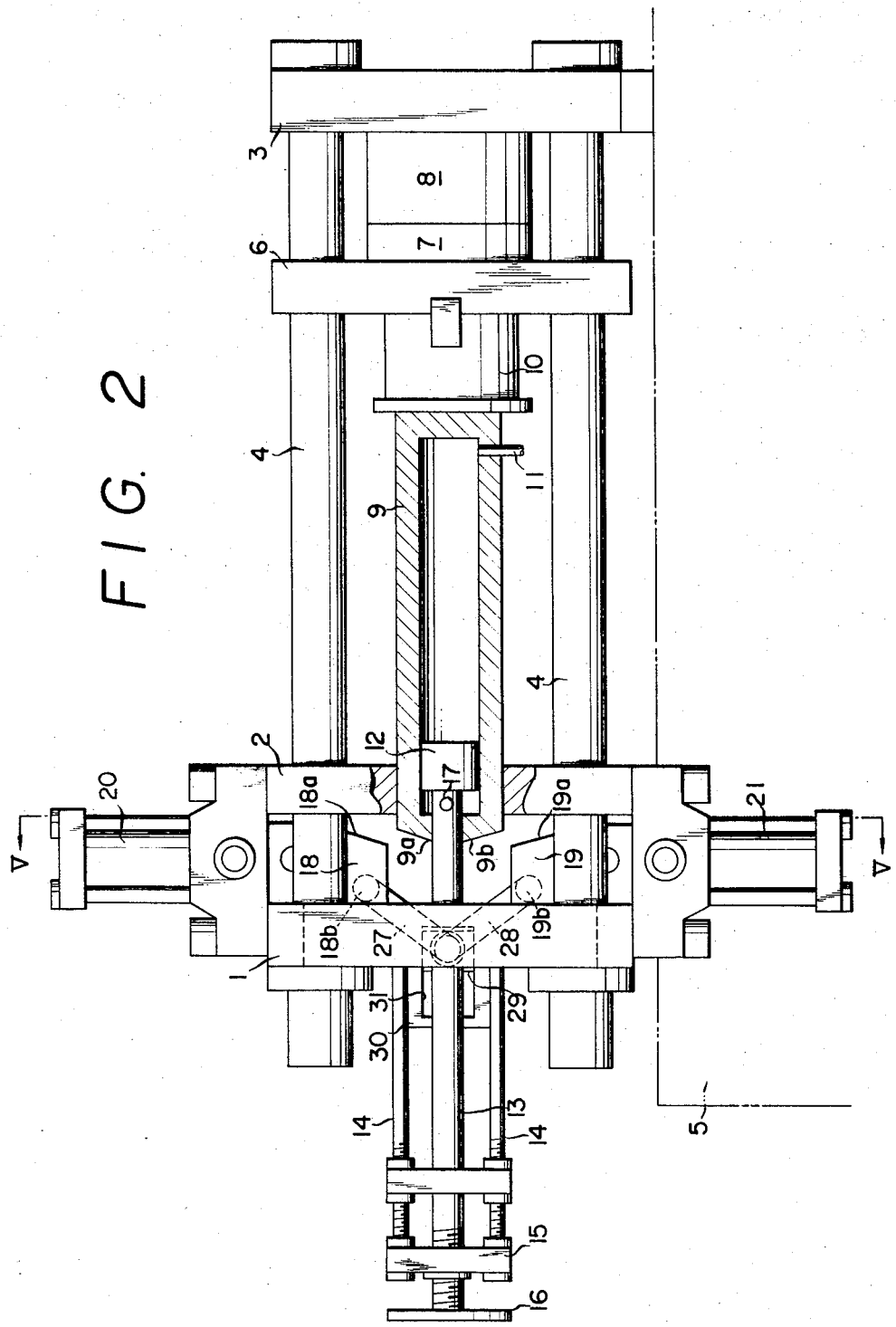
FIG. 2 is a partially cut away side view showing the mold in its clamping state at fast feeding.

The apparatus of the present invention has been illustrated with reference to one embodiment thereof which has the above described structure. In order to clamp mold half 7 (fixed on the movable platen 6) against the other mold half 8 (fixed on the pressure resistant stationary platen 3) pressurized fluid is supplied into the moving cylinder 9 from the inlet-outlet opening 11 of the moving cylinder 9, to move the moving cylinder 9 to the right hand against the piston 12 from the position shown in FIG. 1. When said moving cylinder 9 has arrived at the terminal position (as is shown in FIG. 2), the pressurized fluid is supplied into the hydraulic cylinders 20 and 21 to operate the wedges 18 and 19 simultaneously towards the axis of the moving cylinder 9, whereby when the oblique surfaces 18a and 19a arrive at the corresponding oblique surfaces 9a and 9b of moving cylinder 9, the moving cylinder 9 is pushed by many times as much force as the force of said hydraulic cylinders 20 and 21 by means of the wedge effect of the respective oblique surfaces (see FIG. 3) to carry out clamping of the mold halves 7 and 8.

In this case, the piston rods 22 and 23 of the hydraulic cylinders 20 and 21 and wedges 18 and 19 should be changed a little against the piston rods 22 and 23. Excessive force cannot be given to the hydraulic cylinders 20 and 21.

In regard to the opening operations for the mold halves 7 and 8 having been subjected to the clamping operation as mentioned above, the opposite operation from the above described operation should be carried out.

In the above described operations, when the wedges 18 and 19 are moved back and forth, and in particular the wedges 18 and 19 are moved backwards, it is necessary to move the two wedges at the same speed accurately, but in accordance with the present invention, as is shown in FIG. 4, the difference of the operation speed of the two wedges 18 and 19 can be detected to adjust the feeding of the pressurized fluid into the hydraulic cylinders 20 and 21, and the speed of the two wedges 18 and 19 are synchronized. Namely, in opening the molds, when the wedges are retracted, if the retracting speed of one, for example, wedge 18, of the wedges is larger than that of the other, i.e., lower wedge 19, the link 27 is pulled upward, but at the same time, the movable roller 29 moves only in right and left directions and therefore the movable metal member 30 will be transferred upwards. Thus, the end of the upper push rod 32 fixed onto the movable metal member 30 engages the roller 36 of the upper selector valve 34 and thereby pressurized fluid is passed to the upper selector valve 34, and the selector valve 38 is transferred by said pressurized fluid, and the circuit of the upper wedge 18 is cut off, to stop the retracting movement of said wedge 18. The opposite operation will also eventually be carried out.

In the drawing (FIG. 4), only the circuit of the case in which wedges 18 and 19 are to be extracted is shown, but in the case in which the wedges are pushed toward each other it will be understood that the wedges 18 and 19 can be pushed forward at the same speed by operating the selector valve into a different path by push rods 32 and 33. In the above given embodiment of the present invention, push rods 32 and 33 are engaged against the rollers 36 and 37 of the selector valves 34 and 35, but it is possible to operate the selector valve 38 by other means such as an electric circuit in which instance micro-switches will be provided in place of selector valves 34 and 35.

Thus, in accordance with the present invention, more than one wedge capable of reciprocating perpendicularly towards the axis of the moving cylinder are provided, and the end surfaces of the respective wedges are formed as oblique surfaces having the same wedge angle as the end surface of the moving cylinder, and when said moving cylinder has come to the terminal position of the mold clamping stroke, the oblique surfaces at the respective end surfaces and the oblique surface of wedges are engaged so that the expanding force caused by the wedge effect generated thereby is utilized as the clamping force of the mold halves. In this way it is possible to obtain greater mold clamping force by a simple structure.

In accordance with the present invention, the structure of the device of the present invention is similar to that used by conventional hydraulic devices except for the structure relating to the mold clamping stroke, and therefore it is possible to adapt the mold clamping structure for use with conventional hydraulic systems.

In accordance with the present invention, the above described wedges are operated by hydraulic cylinders, and the wedges and the piston rods of the hydraulic cylinders are rotatably connected in the form of hinge. Therefore, even if either of the centers of the hydraulic cylinders is more or less displaced, the displacement can be absorbed by the connecting portion, and shaking of the hydraulic cylinder, friction on the contacting surfaces of the respective portions can be prevented, and the wedge effect can be smoothly, consistently and accurately obtained.

Further in accordance with the present invention, a plural number of wedges and movable metal members are connected through links, and the difference of the operation speed of said plural number of wedges is detected through the movable metal member, and thereby the wedges are operated to control hydraulic cylinder, and therefore the respective wedges can be accurately operated at the same speed, and the uniform and accurate mold clamping and opening operation can be always carried out.

The drawing and the description thereof describe only one embodiment of the present invention. Various other modifications may suggest themselves to those skilled in the art without departing from the spirit of the invention.

What is claimed is:

1. A mold clamping mechanism for a molding machine comprising a longitudinally reciprocating cylinder, a plurality of wedges having an oblique surface connected through links to a movable metal member wherein a difference in operational speed of the wedges relative to each other causes movement of said movable metal member, each wedge being capable of reciprocal movement perpendicularly towards and away from the axis of said cylinder, one end of said cylinder being provided with at least one oblique surface extending at an angle complementary to each angle of the oblique surface of said wedges, means for alternately reciprocating said cylinder towards and away from a mold clamping position, hydraulic actuating means, including a connecting rod for each wedge, said connecting rod being hinged to allow pivotal movement between the actuating means and each wedge, for forcing each wedge towards said axis of said reciprocable cylinder when said cylinder approaches the mold clamping position and for continuing to force each wedge towards said axis so that each of said oblique surfaces engages the corresponding oblique surface of the moving cylinder, and means to detect movement of said movable metal member and to compensate for said movement whereby the operational speed of said wedges is controlled to minimize differences therebetween, whereby the wedge effect caused by said engagement generates a force which is utilized as the clamping force for the mold.

2. A mold clamping mechanism for a molding machine according to claim 1 wherein said means to detect movement of said movable metal member and to compensate for such movement includes at least one selector valve and means attached to said movable metal member and movable therewith to actuate said selector valves as necessary to adjust the hydraulic pressure of forcing said wedges into clamping position to equalize forward movement of said wedges.

3. A mold clamping mechanism for a molding machine comprising a tie bar frame, a hollow cylinder longitudinally reciprocating in said frame having a pair of oblique surfaces at one end thereof, a movable plate fixed to the other end of said cylinder and slidably received in said frame, at least one stationary plate disposed adjacent the end of said frame closest said one end of said cylinder for guiding the movement of said cylinder, a stationary mounting means extending axially away from said end of said frame and slidably receiving said cylinder, stationary mounting means, hydraulic means associated with said piston means and said cylinder means for longitudinally displacing said cylinder means relative to said piston means towards and away from a mold clamping position, a pair of wedges disposed on opposite sides of said cylinder adjacent said end of said frame, said wedges each having an oblique surface complementary to one of said oblique surfaces of said cylinder and being adapted for reciprocal movement towards and away from the aixs of said cylinder, hydraulic actuating means, including a hydraulic driven reciprocating piston, a connection rod fixed to said piston and hingedly connected to the corresponding wedge to permit pivotal movement between said connecting rod and said wedge, for forcing said wedges towards said axis of said cylinder when said cylinder approaches the mold clamping position and for continuing to force said wedges towards said axis so that the oblique surfaces of said wedges engage the corresponding oblique surfaces of the moving cylinder, switch means for actuating said hydraulic actuating means, a movable metal member connected through links to said wedges, said movable metal member being adapted to actuate said switching means to compensate for differences in the operational speed of said wedges, said links consisting of a pair of levers pivotally connected at one end to a common point on a longitudinally slidable member and at the other end to the respective wedges, said longitudinally slidable member being slidably disposed in a vertically movable member having a pair of ends adapted to engage said switch means to maintain a substantially constant operational speed of the wedges, whereby the wedge effect caused by said engagement generates a force which is utilized as the clamping force for the mold.

* * * * *